United States Patent

[11] 3,568,632

| [72] | Inventor | Gary F. Cawthon |
| | | 1033 Billard St., Topeka, Kans. 66604 |
| [21] | Appl. No. | 809,576 |
| [22] | Filed | Mar. 24, 1969 |
| [45] | Patented | Mar. 9, 1971 |

[54] LENS COATING APPARATUS
8 Claims, 8 Drawing Figs.

[52] U.S. Cl. .................................................. 118/49,
 118/69
[51] Int. Cl. ................................................. C23c 13/08
[50] Field of Search............................................ 118/48-
—49.1, 500, 503; 117/106—107.2;
214/(Inquired); 198/(Inquired); 266/4 (B); 263/6;
104/(Inquired)

[56] References Cited
UNITED STATES PATENTS

| 2,239,642 | 4/1941 | Burkhardt et al. | (118/49) |
| 2,382,432 | 8/1945 | Mc Manus et al. | 118/49X |
| 2,410,720 | 11/1946 | Dimmick | 118/49 |
| 2,532,971 | 12/1950 | Vanleer et al. | 118/49.1X |
| 2,746,420 | 5/1956 | Steigerwald | 118/49X |
| 2,799,600 | 7/1957 | Scott | 118/49X |
| 2,975,753 | 3/1961 | Hayes | 118/49 |
| 3,039,952 | 6/1962 | Fairchild et al. | 118/49X |
| 2,978,237 | 4/1961 | Frank | 263/6 |
| 3,086,882 | 4/1963 | Smith, Jr. et al. | 118/49.1X |
| 3,206,322 | 9/1965 | Morgan | 118/49X |

Primary Examiner—Morris Kaplan
Attorney—John A. Hamilton

ABSTRACT: A lens coating apparatus consisting of a housing and means for producing a vacuum therein, said housing being divided into three chambers through which a lens-carrying holder may be passed in sequence, first a chamber in which the lenses are preheated and a vacuum formed to drive off occluded gases therefrom, second a coating chamber in which the lenses are coated by metallic vapors emanating from an incandescent source, and third a cooling chamber in which the lenses are gradually cooled, and a system of valves whereby lenses may be inserted in or removed from the preheating or cooling chambers, or advanced from one chamber to the next, without disturbing the vacuum in any other chamber.

INVENTOR.
Gary F. Cawthon
BY John A. Hamilton
Attorney.

INVENTOR.
Gary F. Cawthon
BY John A. Hamilton
Attorney.

LENS COATING APPARATUS

This invention relates to new and useful improvements in apparatus for cooling optical lenses, and has particular reference to devices for coating lenses with various material, usually metallic, to give the lenses desired tints of color, such as for sunglasses, or spectacles for persons having eyes abnormally sensitive to bright light.

Usually, this process is performed by introducing the lenses into a vacuum chamber in which three general functional steps are performed. First, the chamber is evacuated to a high degree of vacuum and preheated, to drive off occluded gases from the lens surfaces which would interfere with the coating operation, the high temperature also being necessary in the coating action. Second, the preheated lens, still in a vacuum, are coated by metallic vapors emanating from an incandescently hot source to produce the desired color tint. For example, copper may be used to produce green tints, nickel to produce gray tints, and chromium to produce brown tints. Generally the density of the tint is regulated by the time of exposure of the lenses to the source. Third, the lenses are gradually cooled, while still in a vacuum, whereupon the vacuum may be relieved and the chamber opened for removal of the lenses. Each of these steps of course requires a certain time period, and neither the second or third steps can be started before the preceding step is completed. Thus, if all three steps are performed in a single vacuum chamber, the operating cycle is necessarily rather long and inefficient as to the quantity of lenses which may be coated in a given interval.

Accordingly, the principal object of the present in apparatus is the provision of a lens coating apparatus which is capable of coating a much greater number of lenses in a given time period, by providing a device including three vacuum chambers, in each of which one of the three operations is carried on at all times. Thus all three of the process steps are being performed simultaneously, though of course on different sets of lenses.

Another object is the provision of an apparatus of the character described in which the operative cycle is further shortened by the provision of means whereby while the first and third chambers, in which the preheating and cooling steps are respectively performed, may be opened to permit the insertion or removal of lenses, such opening does not relieve the vacuum in any other of the chambers. Also, the vacuum of the second or central chamber, in which the actual coating takes place, need never be relieved in normal usage. This provision is especially important in that, depending on the capacity of the vacuum pump used, the pumping of the chambers to a suitably high degree of vacuum is perhaps the most time consuming step of the entire process, and the time required increases in proportion to the volume which must be evacuated.

A further, object is the provision, in an apparatus of the character described, of means whereby the source of coating material, which must necessarily be disposed within the coating chamber, is rene rendered interchangeable by means external to the chamber, and which may be replenished by means involving relieving the vacuum in only a small portion of the entire housing volume.

Other objects are simplicity and economy of construction, efficiency and dependability of operation, and ease and convenience of usage.

With these objects in view, as well as other objects which will appear in the course of the specification, reference will be had to the accompanying drawing, wherein.

Figure 1:
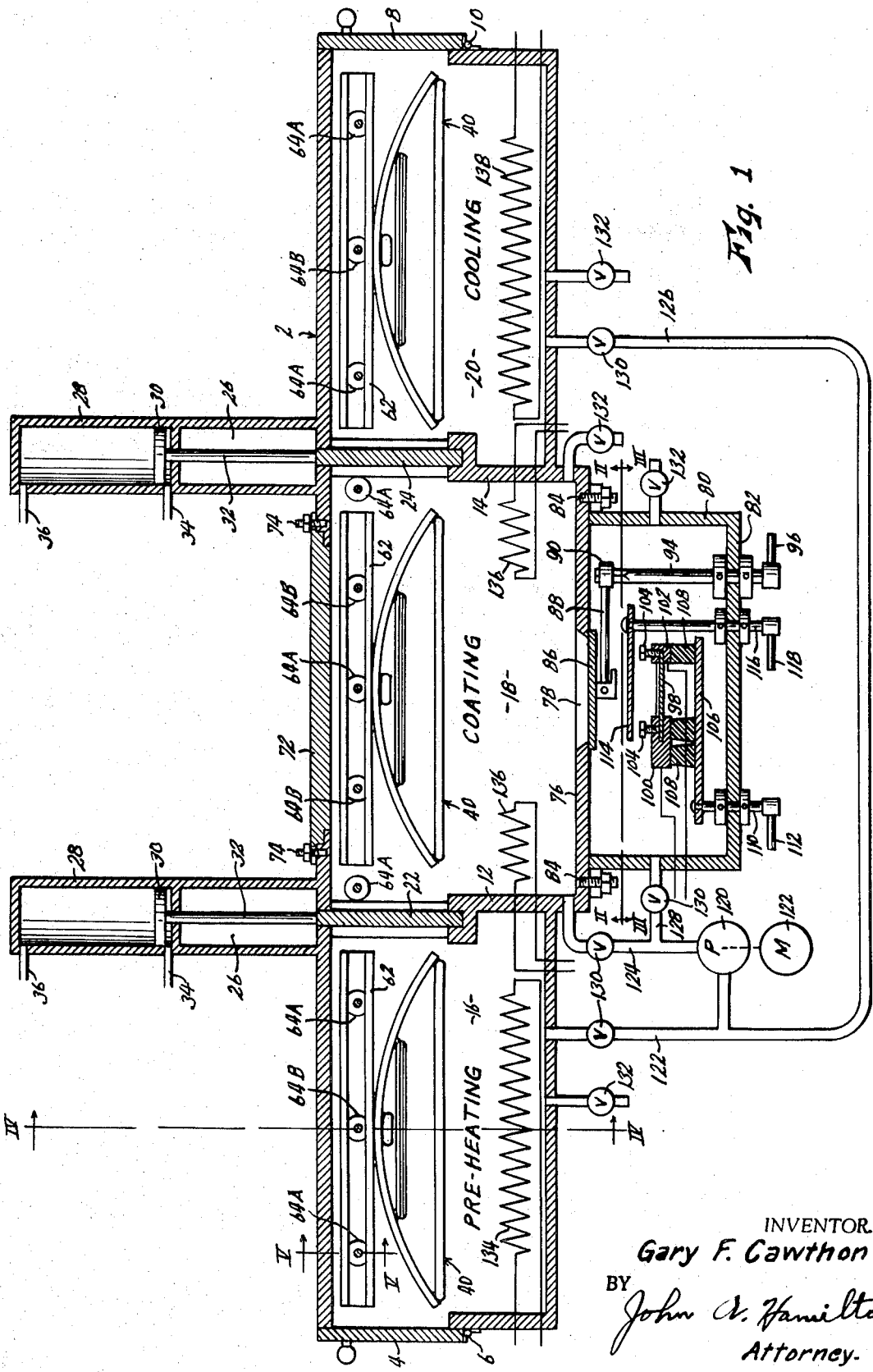
FIG. 1 is a longitudinal sectional view of a lens coating apparatus embodying the present invention, shown partially in a schematic form, and with the lenses and portions of the lens holders omitted.

Like reference numerals apply to similar parts throughout the several views, and the numeral 2 applies generally to the housing of the apparatus forming the subject matter of the present invention. Said housing is horizontally elongated, and the lenses to be coated pass therethrough from left to right as viewed in FIG. 1. At its entry end, the left end in FIG. 1, said housing is provided with an entrance door 4 hinged thereto at 6, and at its exit end with a door 8 hinged thereto at 10. Said doors close the door openings completely, and may be provided with any suitable seals, not shown but well understood in the art, in order to maintain a vacuum in the housing, and are arranged to be held closed by said vacuum. Intermediate its ends, the housing is divided by transverse partition walls 12 and 14 into a preheating chamber 16 adjacent door 4, a central coating chamber 18, and a cooling chamber 20 adjacent exit door 8. Partition walls 12 and 14 are provided with valve gates 22 and 24 respectively, each large enough that, when open, they permit passage between chambers of anything small enough to pass through the openings of doors 4 and 8, and are provided with suitable seals, not shown, so that when closed they form complete and effective vacuum seals between chambers. They are closed when in their lowered positions as shown in FIG. 1, but each is adapted to be raised to its open position into a sealed chamber 26 at the top of housing 2 by means of one or more (two shown) fluid cylinders 28 mounted above chambers 26, each of said cylinders including a piston 30 vertically movable therein and connected to the associated valve gate by a piston rod 32 extending downwardly through chamber 26. Each cylinder is provided with fluid inlets 34 and 36 through which fluid under pressure may be admitted to raise and lower the associated valve gate respectively. The fluid controls for these cylinders may be standard, it being understood that each of the valve gates is operable independently of the other.

Figure 7:
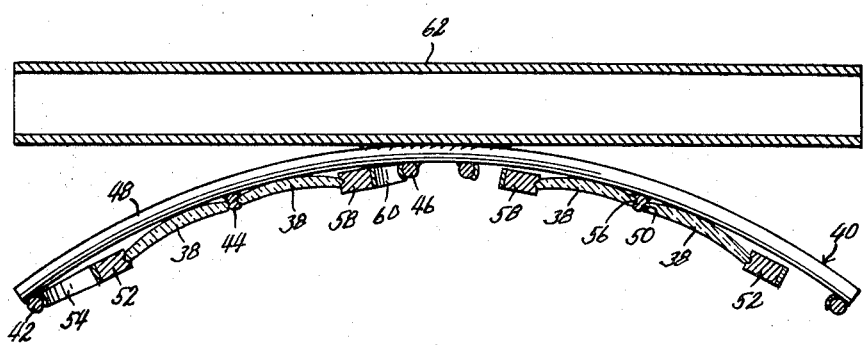
FIG. 7 is a sectional view of one of the lens holders, taken on line VII–VII of FIG. 8.
Figure 8:
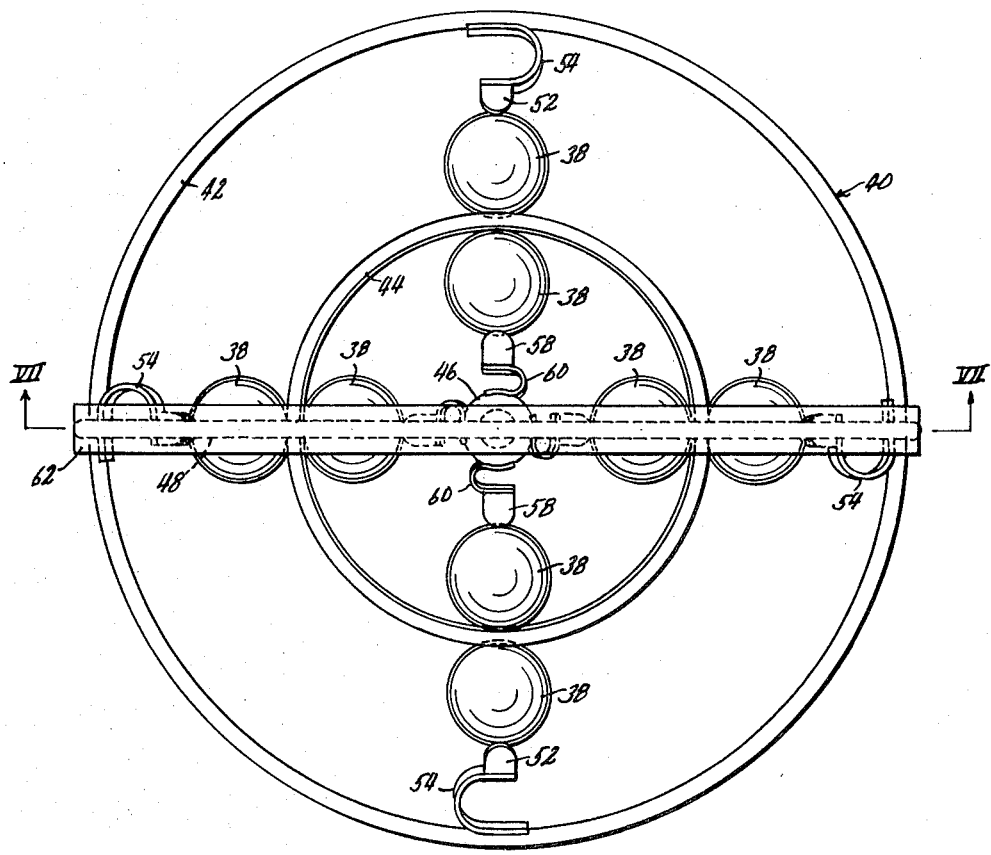
FIG. 8 is a top plan view of one of the lens holders, with lenses mounted operatively therein.

Lenses 38 to be coated (see FIGS. 7 and 8) are mounted in carriers each designated generally by the numeral 40. As best shown in FIGS. 7 and 8, each carrier consists of a series of rings 42, 44 and 46 of successively smaller diameter affixed to a crossbar 48 to form a downwardly concave shape of skeletal configuration. Some of the lenses have one edge thereof engaged in a groove 50 formed peripherally in the outer edge of intermediate ring 44 and their opposite edge engaged in a grooved head 52 carried at one end of a spring arm 54, the opposite end of said arm being fixed to outer ring 42. Similarly, other lenses are mounted between a groove 56 formed in the inner edge of intermediate ring 44, and heads 58 and springs 60 carried by inner ring 46. Springs 54 and 60 must be resiliently deflected to permit insertion of the lenses. A large number of lenses may thus be held by each carrier, though the number has been reduced in the drawing in the interests of simplicity, and each lens is so disposed that all are equidistant from the center of spherical curvature of the carrier. Each carrier also includes a horizontally opening C-shaped track channel 62 extending horizontally thereabove and permanently affixed to crossbar 48.

Figure 4:
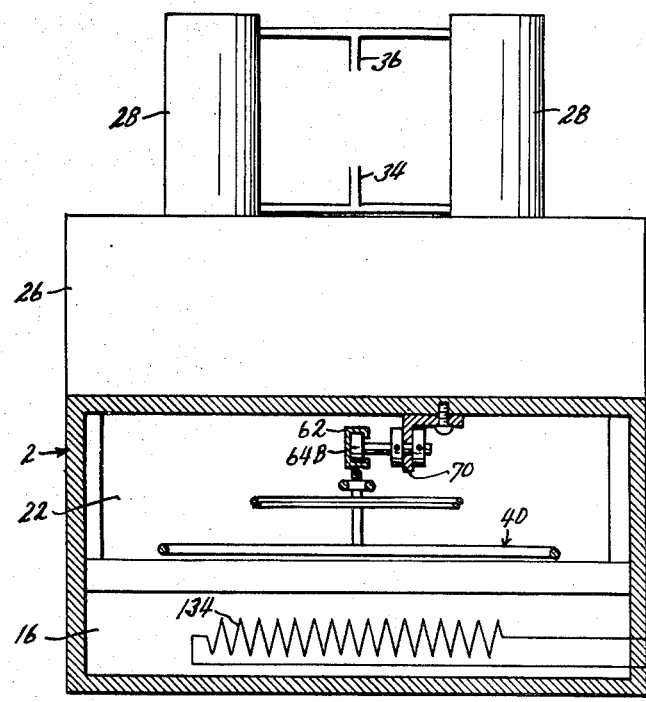
FIG. 4 is a sectional view taken on line IV–IV of FIG. 1.
Figure 5:
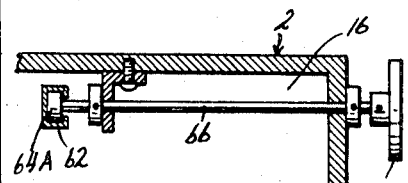
FIG. 5 is a fragmentary sectional view taken on line V–V of FIG. 1.

Carriers 40 are transported through housing 2 by a series of rollers 64A and 64B arranged inside said housing along the top thereof in linear relation, and adapted to engage in channels 62 of the carriers. Each of the rollers rotates on a horizontal axis transverse to the housing. Rollers 64A (see FIG. 5) are each mounted on a horizontal shaft 66 which extends outwardly through a sidewall of the housing through suitable vacuum seals, not shown, and is fitted at its outer end with a handwheel 68 by means of which the roller may be turned to move any channel 62 in engagement therewith. Rollers 64B are idlers, each simply being mounted rotatably by a bracket 70 affixed in the housing (see FIG. 4). Handwheels 68 could also be operated by a motor or other power other power means, if desired. No two successive drive rollers 64A are so far apart that at least one does not engage the channel 62 of any carrier which is in the housing. Coating chamber 18 may be provided with a top access door 72, if desired, removably secured in place by bolt studs 74 or other suitable means, and provided with vacuum seals, not shown. The mounting bracket 70 of any idler roller 64B disposed directly beneath said door may be affixed directly to said door.

Figure 2:
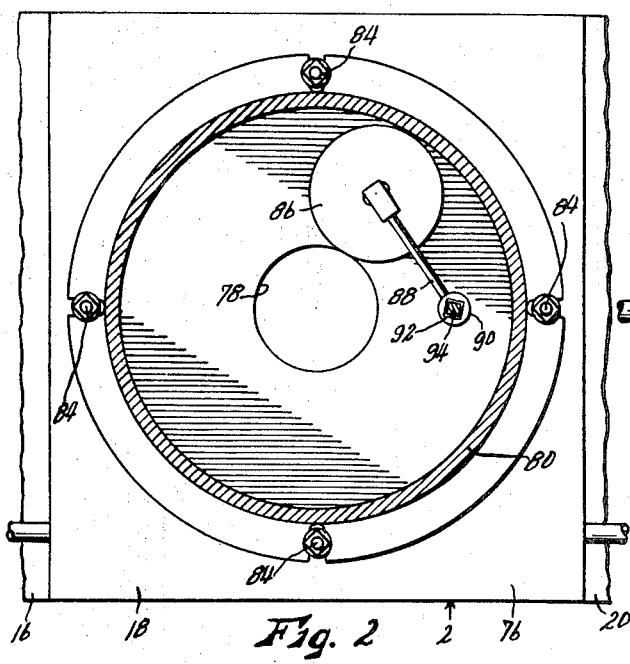
FIG. 2 is a fragmentary sectional view taken on line II–II of FIG. 1, with the vacuum gate to the coating chamber in its open position.

The floor 76 of coating chamber 18 is provided with a central aperture 78, and disposed beneath said floor is a source housing 80. Said housing is circular, being closed at its lower end by floor 82. It is open at its upper end, but is releasably secured to floor 76, with suitable vacuum seals, not shown, by bolt studs 84 or other suitable means. Aperture 78 may be sealed, to preserve a vacuum in chamber 18 when chamber 80 is removed, by a circular valve plate 86 adapted to overlie said aperture beneath floor 76, and having a suitable sealing gasket, not shown. Attached to the lower side of plate 86, within housing 80 is a radially extending arm 88 having at its outer end a hub 90 with a square hole 92 formed vertically therethrough (see FIG. 2). Said hole slidably but nonrotatably receives the squared upper end portion of vertical shaft 94 rotatably mounted in floor 82 of housing 80, and provided externally of said housing with a handle 96. If valve plate 86 is closed and housing 80 is removed, the vacuum of chamber 18 will hold it in place, and shaft 94 will slide out of hub 90. Plate 86 may be moved to one side to leave aperture 78 unobstructed, as shown in FIG. 2, by turning handle 96.

Figure 6:
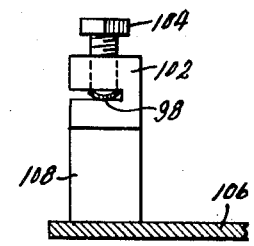
FIG. 6 is an enlarged fragmentary sectional view taken on line VI–VI of FIG. 3.

A plurality (three shown) of source heating elements 98 are disposed within housing 80, each consisting of an elongated strip of material capable of being heated to an incandescent temperature by an electric current passed therethrough, and transversely curved to be upwardly concave as shown in FIG. 6, so that powdered metal or other coating material may be deposited therein. Each element 98 extends horizontally between a pair of terminal blocks 100 and 102, being releasably secured therein by set screws 104. The terminal blocks are mounted on a horizontal plate 106 just above floor 82, being insulated from said plate by insulator blocks 108. Said plate is affixed to the upper end of a vertical shaft 110 rotatably mounted in floor 82 of housing 80 and provided exteriorly of said housing with a handle 112. Elements 98 are disposed radially to the axis of shaft 110, so that by operating handle 112 any one of said elements may be centered beneath aperture 78. When so disposed, the midpoint of that element is at the center of spherical curvature of a lens holder 40 centered in coating chamber 18. It will be understood that the electrical system for supplying current to source heating elements 98 may be standard, permitting close control of the temperatures thereof, and that the temperature of each element may be controlled independently of any other element.

Interposed between heating elements 98 and aperture 78 is a horizontal shutter plate 114 affixed to the upper end of a vertical shaft 116 rotatably mounted in floor 82 and provided exteriorly of housing 80 with a handle 118. By turning said handle, said shutter may be selectively disposed between elements 98 and aperture 78, as in FIG. 1, or swung to one side, as in FIG. 3. All of shafts 94, 110 and 116 are provided with suitable vacuum seals, not shown, where they pass through floor 82.

Also provided is a vacuum pump 120, driven as shown by an electric motor 122, with suction conduits 122, 124, 126 and 128 extending therefrom respectively to chambers 16, 18, 20 and 80 to evacuate air therefrom. These conduits may be flexible where necessary or desirable. Each conduit is provided with a valve 130 whereby the associated chamber may be isolated from the vacuum pump, and each of the respective chambers is also provided with a valve 132 which may be opened to admit air to that chamber to relieve the vacuum therein. Chambers 16, 18 and 20 are provided respectively with electric heater elements 134, 136 and 138, indicated diagrammatically, whereby said chambers may be heated. The electrical control system for the heater elements may be standard and is not shown, though it will be understood that said system permits individual control of the temperatures of the various chambers.

In operation, assume first that all of chambers 16, 18, 20 and 80 have been evacuated to the desired degree of vacuum by pump 120, that chambers 16, 18 and 20 have been heated to their desired temperature by their respective heater elements 134, 136 and 138, and that valve plate 86 is open as shown in FIG. 2. When valve 86 is open, source housing 80 is effectively a portion of coating chamber 18. At this time, the desired coating material has been deposited in source heating elements 98, commonly called "boats," and the desired boat disposed directly beneath aperture 78 by operation of handle 112, but the temperature of that boat is controlled to be just below the vaporization temperature of the coating material.

Valve 130 of chamber 16 is then closed to isolate that chamber from the pump, and valve 132 of that chamber is opened to admit air to relieve the vacuum therein. Entry door 4 may then be opened and a lens carrier 40, loaded with lenses as described, is inserted by engaging channel 62 of the carrier over rollers 64A and 64B. Valve gate 22 is of course closed at this time, so that the vacuum in chambers 18 and 20 is not affected. Door 4 is then closed, valve 132 closed and valve 130 opened, whereupon the vacuum in chamber 16 is reestablished and the lenses preheated. After a predetermined time to permit full establishment of the vacuum and the preheating of the lenses to drive occluded gases from the surfaces thereof, valve gate 22 is opened and lens carrier 40 is moved into coating chamber 18 by operation of the appropriate handwheels 68, and valve gate 22 is closed. Said valve gate moves easily, since a vacuum exits at both sides thereof. As soon as gate 22 is closed, the process of inserting another carrier 40 into chamber 16, as just described, may be recommenced.

Figure 3:
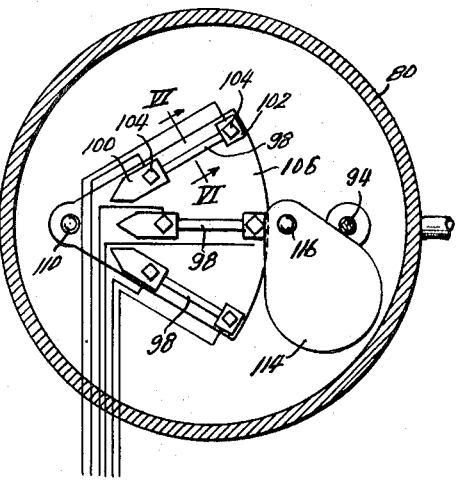
FIG. 3 is a sectional view taken on line III–III of FIG. 1, with the shutter in its open position.

Within chamber 18, the element 98 in use is then raised in temperature to the vaporization temperature of the coating material, by increasing the electric current in said element. This may be done quite rapidly, if as previously suggested the element temperature has previously been brought almost to the vaporization point. Shutter 114 is then opened by manipulation of handle 118, as shown in FIG. 3, whereupon the coating material emanates from element 98 in vapor form through aperture 78 and coats the lenses held by the carrier 40 within chamber 18. After a predetermined period to allow the desired density of coating to take place the shutter is closed. The use of the shutter prevents coating from occurring during the time the coating material is traversing the vaporization temperature, during which the coating would be spotty and imperfect, and also permits close control of the exposure time. The temperature of element 98 may then be again lowered below the vaporization point, valve gate 24 opened, handwheels 68 turned to move lens carrier 40 from chamber 18 to chamber 20, and valve gate 24 closed. Chamber 18 is then ready to receive another carrier 40 from chamber 16 as previously described.

The temperature and degree of vacuum in chamber 20 may then be reduced, as gradually as may be deemed desirable, by reducing the current to heater element 138, and by closing valve 130 and opening valve 132 of said chamber. When the pressure therein has been increased to or near atmospheric pressure, exit door 8 may be opened and the lens carrier 40 removed therefrom, with the lenses carried thereby fully coated. Door 8 is then closed, valve 132 of chamber 20 closed and valve 130 opened to reestablish the vacuum in said chamber, and current supplied to heating element 138 to raise the temperature in chamber 20 to or near the temperature of chamber 18. Chamber 20 is then ready to receive another carrier 40 from chamber 18 as already described. Isolation and relief valves 130 and 132 of coating chamber 18 need not be operated in normal usage of the apparatus as just described, since the vacuum therein need never be relieved, but may be used to relieve the vacuum in chamber 18 if for any emergency reason it is desired to remove door 72 to gain access to said chamber without relieving the vacuum in chamber 16 or 20. Within chamber 18, it will be seen that since the coating material emanates in straight lines from source heater element 98, the heating elements 136 of said chamber should be arranged so as not to obstruct any straight line path from element 98 to the lenses.

The use of three or more source heater elements 98, as shown, operable from externally of the housing to be placed selectively in position for use, greatly increases the quantity of lenses which may be coated before the housing must be opened to recharge the source. It also permits each element to be charged with a different coating material, so that by manipulating handle 112, the material with which successive carriers 40 of lenses are coated can be changed without opening the housing, or different materials can be used in combination to coat a single batch of lenses if desired. Nevertheless, the source elements 98 must be recharged frequently, and for this reason it is highly desirable that housing 80 of said elements, which may be regarded as a portion or extension of chamber 18, be openable without relieving the vacuum in chambers 16, 18 or 20, as the latter would represent loss of the time required to reestablish said vacuum. This may be done by closing valve plate 86 as shown in FIG. 1, closing valve 130 and opening valve 132 of chamber 80 to relieve the vacuum therein, releasing bolt studs 84, and dropping housing 80 free of housing 2. After elements 98 are recharged with coating material, housing 80 is reattached to housing 2 by reversing the process just described, making certain that shaft 94 reengages in hub 90.

Other types of source heater element 98 than those actually shown could be used. For example, an ordinary helical heater coil could be used, with a shallow container for coating material attached directly thereto, or such a coil could be used which is coated with a solidified plastic or the like in which the coating material is suspended.

While I have shown and described a specific embodiment of my invention, it will be readily apparent that many minor changes of structure and operation could be made without departing from the spirit of the invention.

I claim:
1. A lens coating apparatus comprising:
   a. an elongated housing through which lenses to be coated are adapted to travel longitudinally, having a sealable entry door at one end thereof and a sealable exit door at its opposite end;
   b. means for transporting lenses through said housing;
   c. a pair of valve gates dividing said housing transversely into three chambers, first a preheating chamber adjacent said entry door, second a coating chamber, and third a cooling chamber adjacent said exit door, said gates when closed sealing adjacent chambers from each other and when open each permitting passage of lenses between adjacent chambers;
   d. means operable to open or close each of said valve gates selectively;
   e. pumping means for evacuating air from said housing;
   f. regulatable means operable to heat each of said chambers;
   g. a source element disposed in said coating chamber and carrying a coating material adapted when heated to incadescent heat to emanate from said element in vapor form;
   h. regulatable means for heating said source element;
   i. said lens transporting means comprising:
      1. a lens carrier adapted to carry a number of lenses mounted therein, and including a track member affixed thereto;
      2. a series of rollers carried rotatably in said housing in alignment longitudinally of said housing, and adapted to engage said track member to support said carrier movably; and
      3. means operable from points external to said housing to rotate certain of said rollers to move said track member longitudinally through said housing.

2. A lens coating apparatus as recited in claim 1 wherein said means for opening and closing said valve gates is operable from a point external to said housing, without relieving the vacuum in said housing.

3. A lens coating apparatus as recited in claim 1 wherein said lens transporting means is operable from a point external to said housing, whereby said lenses may be transported from chamber to chamber without relieving the vacuum therein.

4. A lens coating apparatus as recited in claim 1 wherein said vacuum producing means comprises:
   a. an operably driven vacuum pump;
   b. separate conduits connecting said pump with each of said housing chambers;
   c. a valve in at least the conduits interconnected to said first and third chambers whereby the associated chamber may be isolated from said pump; and
   d. a valve interconnected to each of said first and third chambers whereby the associated chamber may be vented to the atmosphere.

5. A lens coating apparatus as recited in claim 1 including a plurality of said source elements each disposed movably in said coating chamber for movement to and from an operating position at which coating material emanating therefrom will coat lenses in said chamber, and with the addition of means operable from externally of said housing to move any one of said source elements selectively into its operating position.

6. A lens coating apparatus as recited in claim 1 with the addition of a shutter member disposed in said coating chamber for movement to and from a closed position in which it is disposed between said source element and the lenses disposed in said chamber, and an open position not disposed between said members, and means operable from externally of said housing to move said shutter selectively between said closed and open positions.

7. A lens coating apparatus as recited in claim 1 wherein said source element is disposed in a secondary housing detachably connected to said first recited housing, there being an aperture between said housings through which coating material may emanate, and with the addition of a valve member operable when closed to seal said aperture, and means operable from externally of said housing to selectively open or close said valve member.

8. A lens coating apparatus as recited in claim 7 wherein said secondary housing is connected to said vacuum pumping means, and with the addition of a first valve means operable to disconnect said secondary housing from said pumping means, and a second valve means operable to vent said secondary housing to the atmosphere.